UNITED STATES PATENT OFFICE.

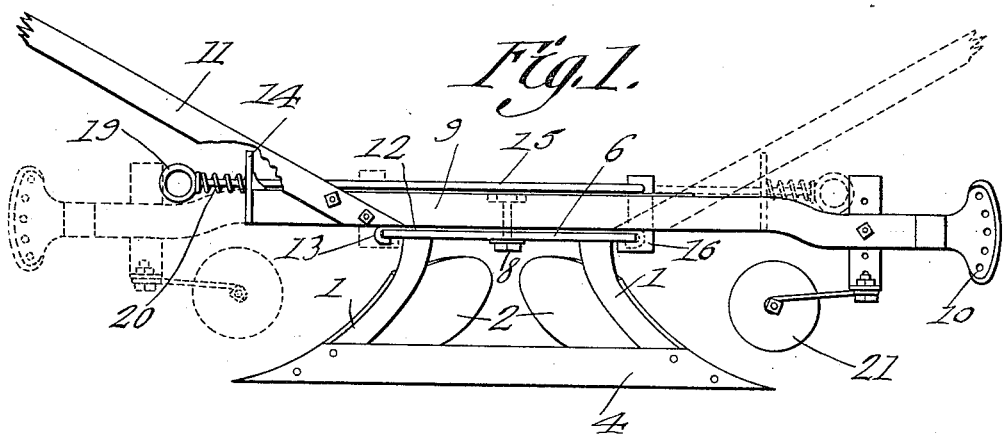
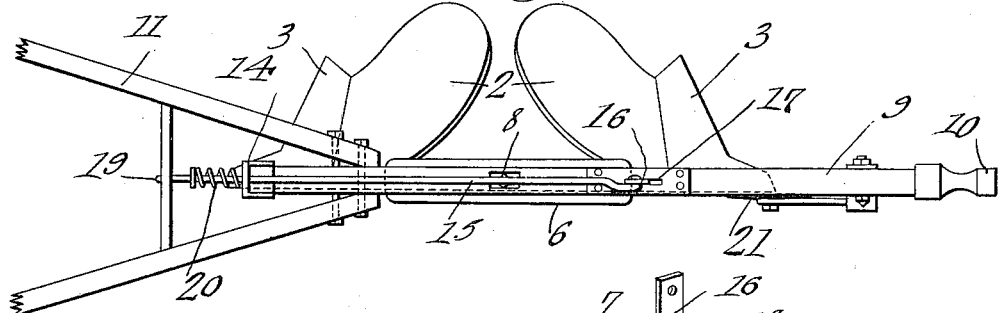
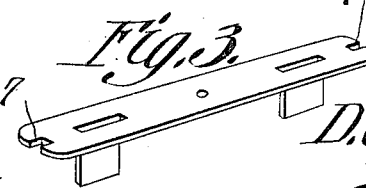

DUGLAS C. WEATHERHEAD, OF SALISBURY, MARYLAND, ASSIGNOR OF ONE-THIRD TO MORRIS AMES WALTON, OF SALISBURY, MARYLAND.

PLOW.

1,143,468.   Specification of Letters Patent.   Patented June 15, 1915.

Application filed November 2, 1914. Serial No. 869,915.

*To all whom it may concern:*

Be it known that I, DUGLAS C. WEATHERHEAD, a citizen of the United States, residing at Salisbury, in the county of Wicomico and State of Maryland, have invented a new and useful Plow, of which the following is a specification.

This invention relates to plows, one of its objects being to provide a plow having opposed shares which are right and left, the standards of the shares being connected to a structure on which is mounted a reversible draft beam whereby, when the plow reaches one end of a field, the beam can be reversed and the plow drawn in the opposite direction, thus to produce the next furrow, this reversal of the plow being effected without the necessity of removing the plow from the ground.

A further object is to provide efficient means for connecting the draft beam to the plow structure, said means including a latch whereby the beam can be securely held in either of its two active positions.

A further object is to provide means whereby the plow structure and the beam are held together rigidly and the strains are equally distributed between the parts so that danger of breakage or separation of the parts is reduced to the minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the plow, the beam being shown in full lines in one position and in dotted lines in another position. Fig. 2 is a plan view of the plow. Fig. 3 is a perspective view of the latch and the parts engaged thereby.

Referring to the figures by characters of reference 1 designates opposed similar standards to each of which is secured a moldboard 2 and a share 3, the plows thus provided being opposed right and left plows. A landside plate 4 connects the standards. The upper ends of the standards are connected by an elongated head 6 the ends of which are preferably rounded as shown, each end having a notch 7. A pivot bolt 8 is extended through the middle portion of the head 6 and extends through a plow beam 9, one end of which has a clevis 10 of the usual or any preferred construction, while the other end portion has handles 11 extending therefrom. A wear plate 12 is secured to the bottom of the beam 9 directly over the head 6 and that end of the plate nearest the handles 11 is formed with a hook 13 designed, when the beam 9 is in active position, to embrace the rear end of the head 6 and thus transfer a portion of the pulling strain from the beam 9 to the end of the head 6. A portion of this strain is likewise received by the pivot bolt 8, as will be obvious.

A bracket 14 is secured to the rear end of beam 9 and has a bar 15 slightly mounted in it, the forward end of this bar being secured to the upper end of a latch 16 slidably mounted in a slot 17 formed in the beam 9. A transverse pin 18 may be connected to the latch 16 to prevent said latch from lifting out of the slot 17. The rear end portion of bar 15 has an enlargement 19 which can be in the form of an eye, foot plate or the like and a spring 20 is interposed between this enlargement and bracket 14 and exerts a constant pull through the bar 15 upon the latch 16 so that said latch will be seated within one of the notches 7 when beam 9 is in active position. A colter 21 can be connected to one end of the draft beam 9 as shown.

As before pointed out, when the beam 9 is in active position, the latch 16 is seated within one of the notches 7 so that said beam 9 and the head 6 are thus held in parallel relation. When the plow is pulled forwardly as ordinarily, the share in front thereof will form a furrow in the usual manner and, when the end of the field is reached, it becomes unnecessary to lift the plow from engagement with the soil or to swing it around as ordinarily. Instead it is merely necessary for the driver to push forwardly upon the bar 15 with his hand or foot, thus forcing the latch 16 out of engagement with head 6. The draft animals can then be driven in a half circle so as to cause the beam 9 to swing about the pivot bolt 8 as a center, this beam, upon reaching a position opposite to that which it formerly occupied, being automatically locked by latch 16 springing into the other notch 7. The plow can now be pulled in the opposite direction and the second share will likewise form a furrow until the end of the field is reached. This operation can be repeated as described, the reversal of the beam at each end of a row being quickly effected so that a great saving of time and labor results.

While the improvements can be used in connection with a walking plow as shown, it is to be understood that the same are equally applicable to a riding plow and to a motor propelled plow. Where the improvements are used in connection with a riding plow, it is merely necessary to connect the supporting wheels to the end portions of the beam 9 and to one side thereof so that, when the beam is reversed, the wheels will travel in a half circle around the shares, as will be obvious.

What is claimed is:—

The combination with opposed standards and opposed right and left hand plows connected thereto, of a flat elongated head secured to the upper ends of the standards and having notches extending toward each other from the ends thereof, a beam above the head and pivotally connected to the center thereof, the ends of the head being rounded, a wear strip secured to the bottom of the beam and normally extending longitudinally above the head, said strip having a hook at one end adapted to engage the rear end of the head thus to thrust longitudinally against the head, the other end of the strip terminating short of the front end of the head, a latch extending through the beam and adapted to be seated in the notch in the front end of the head, and to extend under said front end of the head, thus to hold the head and beam against relative swinging movement and to support the front end of the head, a rod pivotally connected to the upper end of the latch, and yieldable means engaging the rod for holding the latch normally in engagement with the head.

In testimony that I claim the foregoing as my own, I have hereto affixed my signature in the presence of two witnesses.

DUGLAS C. WEATHERHEAD.

Witnesses:
HUBERT D. LAWSON,
R. M. PARKER.